B. LOOMIS & H. PETTIBONE.
APPARATUS FOR MANUFACTURING AND MIXING GASES.
APPLICATION FILED MAY 22, 1907.
912,698.
Patented Feb. 16, 1909.
2 SHEETS—SHEET 1.
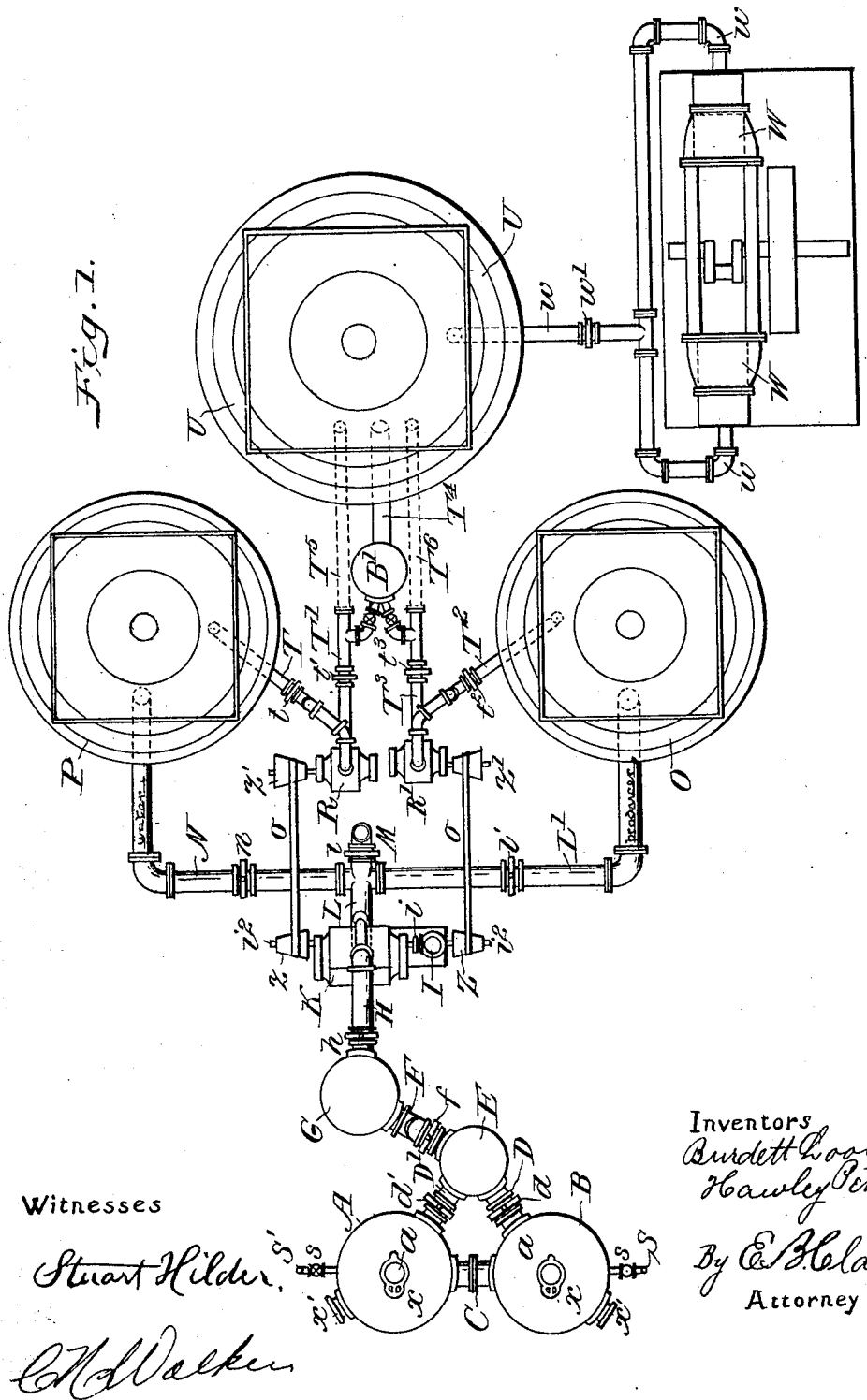
Witnesses
Inventors
Burdett Loomis
Hawley Pettibone
By E. B. Clark
Attorney B. LOOMIS & H. PETTIBONE.
APPARATUS FOR MANUFACTURING AND MIXING GASES.
APPLICATION FILED MAY 22, 1907.
912,698.
Patented Feb. 16, 1909.
2 SHEETS—SHEET 2.
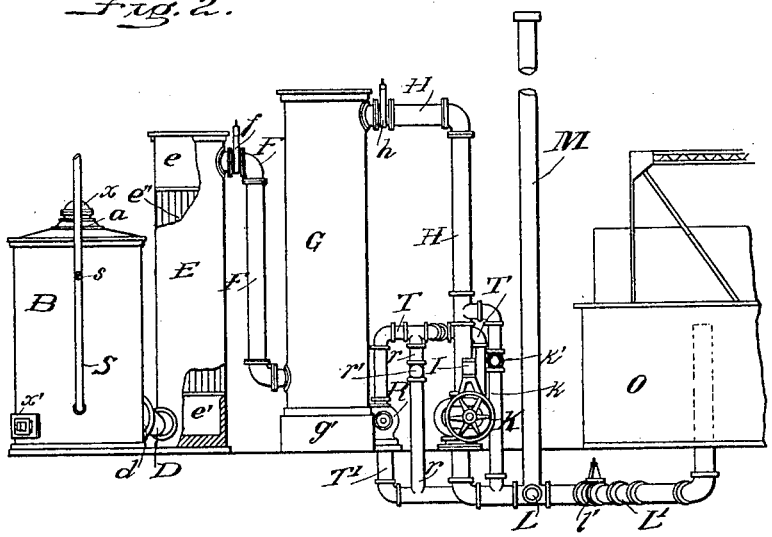
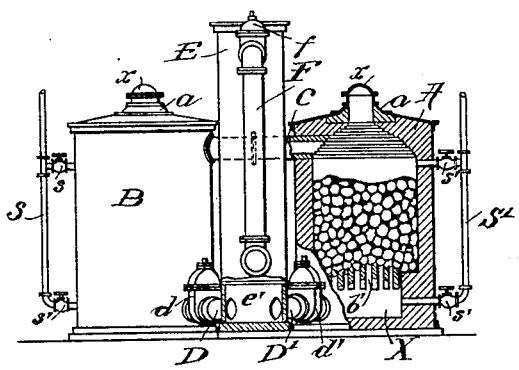
Witnesses
Inventors
Burdett Loomis
Hawley Pettibone
By E. B. Clark
Attorney

UNITED STATES PATENT OFFICE.

BURDETT LOOMIS, OF HARTFORD, CONNECTICUT, AND HAWLEY PETTIBONE, OF NEW ROCHELLE, NEW YORK, ASSIGNORS TO POWER AND MINING MACHINERY COMPANY, OF NEW YORK, N. Y., A CORPORATION OF NEW JERSEY.

APPARATUS FOR MANUFACTURING AND MIXING GASES.

No. 912,698.     Specification of Letters Patent.     Patented Feb. 16, 1909.

Application filed May 22, 1907. Serial No. 375,035.

*To all whom it may concern:*

Be it known that we, BURDETT LOOMIS, residing at Hartford, in the county of Hartford and State of Connecticut, and HAWLEY PETTIBONE, residing at New Rochelle, in the county of Westchester and State of New York, citizens of the United States, have invented certain new and useful Improvements in Apparatus for Manufacturing and Mixing Gases, of which the following is a specification.

This invention relates to improved apparatus for making, delivering and mixing gases of any desired calorific value and in any desired proportions of their constituents relative to their heat units so as to have them adapted for motive power in high power gas engines.

The object of the invention is to provide for generating a gas of the nature of that generally termed producer gas, and also a gas of the nature of that termed water gas, drawing them from the generating or producer furnaces by suitable means and, by suitable means, producing a mixture thereof in predetermined, though variable proportions, to have them give the most effective and economical results as a motive agent in an explosive engine of high horse-power.

Heretofore, gas engines have been operated by illuminating gas, and attempts have been made to operate engines of 100 H. P. and more with water gas. But the flame temperature and heat units of such gas have been found to be too high to give satisfactory results. The explosions produced by water gas, owing probably to the large percentage of hydrogen therein, are too sharp and quick; the inertia of the heavy engine parts is too great to be efficiently overcome; the gas is apt to fire back and the engines are so strained and racked that an uneven power is generated. Water gas ignites at so low a temperature that when properly mixed with air for the explosive charge in a gas engine, the charge will explode prematurely during the operation, due to the heat caused by compression and the hot internal parts. Since the efficiency of a gas engine increases with the compression of the charge it is important to have a gas that will stand high compression. On the other hand a gas having the characteristics of producer gas has also been found to be not available because of a large percentage of carbonaceous constituents—unfixed carbon and nitrogen—these not only causing sluggishness in the explosions but also tending to leave so large a quantity of residual matter in the form of sooty or charry bodies as to seriously interfere with, and finally render inoperative, the various ports or passageways and the valves and small moving parts of the engine. By varying the calorific value and constituents of the gas produced and delivered by the one apparatus, a mixture can be made of such quality as is best adapted for use in the particular engine it must operate.

We have found that a mixture of water-gas and producer-gas in predetermined proportions (varied to meet the variations in the constitution of the gases due to variations in the constituents of the initial fuel material and to variations in conditions of production) gives a substantially uniform body which can be used with great efficiency in high power explosive engines.

Figure 1 is a top plan view, diagrammatic and conventional in character, of an apparatus embodying our improvements. Fig. 2 shows in side elevation one form of apparatus by which our improved method can be carried out, of operating a gas engine and supplying it with a proportioned mixture of producer-gas and water-gas. Fig. 3 is a rear elevation of the connected generators and a steam boiler, parts being shown in sections.

The generators A and B are constructed of brick inclosed in iron jackets in the usual manner and are provided with grates $b'$, of any desired construction, and with ash pits X. The generators are connected at the top by a pipe or flue C, and are connected at the base or ash pits X by gas outlet pipes $D, D^1$—having valves $d, d'$—with the base of the tubular steam boiler E, having at top and bottom, the gas chambers $e, e'$ and tubes $e''$ connecting the upper and lower tube sheets. A gas outlet pipe F, having a valve $f$, connects with the upper gas chamber $e$ and with the base of the scrubber G, and a gas outlet pipe H, having a valve $h$, leads from the top of the scrubber down to the main gas exhauster K. The main gas take-off pipe L leads from the under side of the exhauster and connects by the branch pipe $L'$, having a valve $l'$, with the holder O for producer-gas. A branch pipe having a valve $l$ connects pipe L with the purge stack M for the escape of waste gases, or products of combustion. A branch pipe N, having a valve $n$, leads from the pipe L into holder P for water-gas. The pipe T having a valve $t$ leads from the holder P and connects with the top of the small exhauster R. The discharge pipe T' from exhauster R is provided with a valve $t'$ and either directly or indirectly delivers the gas to a receptacle adapted to effect the mixing of the producer gas and the water gas or to receive the mixture after it is formed. U indicates such a receptacle which we prefer to construct in the form of a gas holder. It is adapted to receive the gases separately and mix them or to receive the mixture of the desired character. It can hold the mingled producer gas and water gas, mixed in predetermined proportions after generation and cleansing, and from it the gas can be taken off to the gas engine, as desired.

R' is an exhauster or suction apparatus which may be substantially similar to that at R. These gas forcing devices R, R' may be actuated in any preferred way. We have shown a shaft $i^2$ which receives power from shaft $i$ of the engine I. Either one or both of the gas forcing devices or exhausters R, R' can be connected to the shaft $I^2$, as by clutches or in any other way.

By preference we employ a mixing chamber such as indicated at B' receiving the water gas from the holder P through the pipes T, T' and the exhauster R, and receiving the producer gas from the holder O through the pipes $T^2$ and $T^3$, and the exhauster at R'. From the chamber at B' the mixed gases pass through pipe $T^4$ to the holder U. The valves at $t$ and $t'$ in the pipes T and T' can be used to close the ducts entirely or can be adjusted to permit such flow of gas as is desired; and at $t^2$ and $t^3$ there are valves in the pipes $T^2$ and $T^3$ which can be similarly manipulated. The quantities or proportions of water gas drawn from the holder P and the producer gas drawn from the holder O by the exhausters R and R' and discharged therefrom to holder U may also be varied and regulated by suitable speed-gearing interposed between the exhausters R, R' and their driving mechanism, for example the cone pulleys Z, Z', respectively, on the driving shaft $i^2$ and on the shafts of the exhausters R, R', may be employed with suitable connecting belts $o$. Under some circumstances the speed adjusting devices and the valves in the pipes T, T', $T^2$ and $T^3$ may be depended on to effect the proportioning of the gases and they may then be respectively taken directly to the holder U as by means of pipes shown in dotted lines at $T^5$, $T^6$.

The gas engine W may be of any of the usual styles or of any preferred sort so far as concerns the principle of construction of its several parts. The present invention is more particularly applicable to gas engines of the larger and more powerful sorts. In these are used large pistons having long strokes and of correspondingly large parts connected therewith, or directly related thereto. At each stroke the piston exerts a powerful suction action, by means of which gas is drawn through pipe $w$ which communicates with holder U.

Fig. 2 shows a slight modification of the apparatus shown in Fig. 1 and correctly represents, in side elevation, the generator B, steam boiler E, scrubber G, exhauster K and the holder O, which are shown in plan view, Fig. 1; also suitable connection pipes for such parts. In addition Fig. 2 shows an auxiliary exhauster R placed to the rear of the main exhauster K instead of in front of the same as shown in Fig. 1. A by-pass and circulating pipe $k$ connects the outlet-pipe L with inlet-pipe H of the exhauster K and is provided with a valve $k'$. A by-pass pipe $r$, having a valve $r'$, connects the inlet-pipe T of exhauster R with its outlet-pipe T'. When both holders O and P are full, or when holder O, only, is full of gas, or if for other reasons it is desired to stop, or reduce the generation of gas, the valve $k'$ in by-pass $k$ may be opened, while the exhauster is kept running, and gas will be circulated through the exhauster, its inlet and outlet pipes and the by-pass pipe $k$. In a similar manner the by-pass pipe $r$ and valve $r'$ may be used for circulating water-gas instead of stopping the exhauster R. This circulation of gas through the by-pass pipes and exhausters will temporarily check the production and withdrawal of gas from the generator.

The operation of making and mixing producer gas and water gas and supplying them to the engine may be conducted as follows: Fires are kindled on the grates in generators A and B, and at first allowed to burn by natural draft while fuel is gradually fed in and ignited. The valves $l'$ and $n$ being closed, and the stack valve $l$ and other valves between the stack and generators being open, and the lids $x$ wholly, or partly, open, the exhauster K is operated to draw air down into the bodies of ignited fuel, and draw the resulting gas off from the bases of the generators, through boiler E and scrubber G, and discharge it up the stack M. As soon as good producer-gas is generated the stack valve $l$ is closed, valve $l'$ opened, and the producer-gas is discharged into the holder O. The stack valve $l$ is only open while the bodies of fuel are being heated to the proper condition for making gas. After the fuel in the generators A and B has reached a predetermined stage in combustion, steam is introduced below the fuel body in one of the generators, as for instance, generator A. Preliminary to this the top lids X, the valve $d'$ and the valve $l'$ are closed, and the valve $n$ is opened, after which the steam valve $s'$ can be opened for the introduction of steam. This steam passes up through the body of fuel in generator A, travels through the interstices between the lumps of fuel, and forcing its way upward through the paths or spaces between the burning particles or lumps. The steam will be more or less decomposed, and the resulting water gas passes through top pipe C into generator B, and thence down through the body of fuel in the latter, where vapors are decomposed and carbonic acid converted into carbon monoxid, and well fixed water gas results. This introducing of steam may continue for as short or as long a time as desired. The gas passes through pipe D, boiler E and scrubber G to the holder P. When it is desired to again form producer gas, the steam is shut off, the top lids X, the valve $d'$ and the valve $l'$ are opened, and the valve $n$ closed. Thereafter, producer gas can be made and delivered to the holder O. When steam is to be introduced at the next stage we preferably close valve $d$ in pipe D, and admit the steam to the base of the generator B. It now travels forcibly upward through the interstices in the fuel therein, forcing a passage through the firebody and then traveling downward through the fuel body in generator A. And such water gas as results is, after passing through the boiler and scrubber, discharged into the holder P. After sufficient quantities of producer gas have been received in the holder P and of water gas in the holder O the desired proportions of gases respectively can be withdrawn therefrom and commingled for use in the gas engine either by allowing the gases to pass under the pressure from the exhausters R, R' to the holder U, or by forcibly commingling them in the chamber at B', by any well-known devices.

Gas engines of the heavy power class require, first, explosions of a peculiar character, second, cleanliness after explosion, and, third, that the explosion should be relatively prolonged in time. If a gas similar to producer gas and having only the qualities and characteristics of that gas be delivered, alone, to the gas engine it may furnish material for explosions, but these are accompanied by, or result in, several disadvantageous matters, as for instance, a slowness and sluggishness in the firing of the gas or explosion with liability of incompleteness of combustion, secondly, the depositing of carbonaceous matters of a sooty or tarry character. On the other hand, if a gas having the qualities and characteristics of water gas be delivered alone, to a gas engine explosions will occur which, though they may not result in the disadvantages incident to the producer gas, and will leave the valves and other parts of the engine in a cleanly condition, are, nevertheless, not efficient with engines of the larger sort, as the impulses are too quick, short, sharp and violent, and will not work advantageously in a long or laterally expanded explosion chamber or piston driving chamber.

Instead of operating a gas engine with gaseous bodies of the above sorts we provide an explosive agent containing intelligently and accurately predetermined proportions of these two widely differing gaseous bodies with the result that the producer gas is, by the water gas, caused to more thoroughly and uniformly and somewhat more rapidly explode than would be the case if it were used alone, and the producer gas by more complete combustion and explosion leaves the engine parts in a cleanly condition; while, on the other hand, the water gas is, by the intermingled producer gas, checked with respect to the quickness, sharpness and violence of its explosions. By first completely separating the two kinds of gas and then accurately commingling them in proportions subject to variation, corresponding to the variations in their constitution which result from different fuel materials or from different conditions in production, the gas engineer is provided with a means for obtaining explosions with complete combustion and of such character that he can impart to his large and relatively slowly moving piston exceedingly efficient energy impulses.

We do not herein claim specifically the combination of the generator, the exhauster, the holder for producer gas, the holder for water gas and means for supplying gas from one of these holders to the other preparatory to supplying the mixture to the gas engine, as we have made that the subject matter of claims in our Patent No. 833,137, issued October 9, 1906. Nor do we herein claim the generating of the producer gas and the water gas in separate volumes, storing them in separate holders, and then commingling them in predetermined quantities and delivering the mixture to a gas engine, as we have made that the subject matter of claims presented in our application No. 334,792, filed September 15, 1906, on which was issued Letters Patent No. 863,730, dated August 20, 1907, in which application, as originally filed, the subject matter of the present application was included, and of which this is a division. Nor do we herein claim the process of generating in a producer a volume of producer gas and then generating in said producer a volume of water gas, and then commingling the producer gas and the water gas and delivering them to a gas engine and exploding them therein, as we have made that the subject matter of claims in another application filed on the 22nd day of May, 1907, as a division of the aforesaid application Serial No. 334,792, on which was issued Letters Patent No. 863,730, dated August 20, 1907.

What we claim is:

1. The combination of the gas producing apparatus adapted to alternately produce water gas and producer gas, suitable gas take-off ducts, a holder for receiving producer gas from the said gas producing apparatus, a second holder for receiving and storing water gas from the said gas producing apparatus, a gas engine, and a supplemental gas holder interposed between the holders aforesaid and the gas engine and adapted to receive and store a mixture of the gases from the said holders prior to their delivery to the engine, substantially as set forth.

2. The combination of the gas producing apparatus adapted to produce alternately water gas and producer gas, gas take-off ducts connecting with the gas producing apparatus, a gas engine, a gas holder communicating with the gas engine and adapted to hold a mixture of water gas and producer gas, gas holders respectively for the water gas and producer gas, intermediate of the mixture holder and the gas producing apparatus, substantially as set forth.

3. The combination of the gas producing apparatus adapted to produce alternately water gas and producer gas, the gas take-off ducts, means for receiving and storing the water gas and the producer gas separately, a gas engine, and a gas holder adapted to hold a mixture of the water gas and the producer gas and arranged intermediately of the gas engine and the aforesaid gas receiving and storing means, substantially as set forth.

4. The combination of the gas producing apparatus adapted to alternately produce water gas and producer gas, a scrubbing or cleansing apparatus, a duct for leading the water gas and the producer gas alternately to the scrubbing or cleansing apparatus, a holder for the water-gas, a holder for the producer gas, means for conducting the water gas to the water-gas-holder independently of the producer-gas-holder, means for conducting the producer-gas to the producer-gas-holder independently of the water-gas-holder, a gas engine, a duct for withdrawing water-gas from the water-gas holder, and conducting it toward said engine, a duct for withdrawing producer-gas from the producer-gas-holder and conducting it toward said engine, a supplemental gas holder adapted to receive the gas from the water gas holder and from the producer gas holder, and interposed between said holders and the engine, and a duct communicating with the last said holder and with the gas engine, substantially as set forth.

5. The combination of the gas producing apparatus adapted to alternately produce water-gas and producer-gas, the scrubbing or cleansing apparatus adapted to alternately receive and cleanse the water-gas and the producer-gas, a producer-gas holder and a second holder for the water-gas, variable means for withdrawing the gases respectively from the said holders, the gas engine and a supplemental gas holder adapted to receive the gases from the water-gas holder and the producer-gas holder and to deliver the mixture thereof to the gas engine, substantially as set forth.

In testimony whereof we affix our signatures in presence of two witnesses.

BURDETT LOOMIS.
HAWLEY PETTIBONE.

Witnesses:
C. LEE STRAUB,
EDGAR M. LEVENTRITT.